United States Patent
Lee (10) Patent No.: US 10,362,728 B2
(45) Date of Patent: Jul. 30, 2019

(54) FLOW DIVERTER FOR A FERTILIZATION SYSTEM

(71) Applicant: Daniel Edgar Lee, Glendale, AZ (US)

(72) Inventor: Daniel Edgar Lee, Glendale, AZ (US)

( * ) Notice: Subject to any disclaimer, the term of this patent is extended or adjusted under 35 U.S.C. 154(b) by 194 days.

(21) Appl. No.: 15/519,815

(22) PCT Filed: Oct. 15, 2015

(86) PCT No.: PCT/US2015/055700
§ 371 (c)(1),
(2) Date: Apr. 17, 2017

(87) PCT Pub. No.: WO2016/061325
PCT Pub. Date: Apr. 21, 2016

(65) Prior Publication Data
US 2017/0245424 A1    Aug. 31, 2017

Related U.S. Application Data

(60) Provisional application No. 62/065,414, filed on Oct. 17, 2014.

(51) Int. Cl.
| | |
|---|---|
| *A01C 23/04* | (2006.01) |
| *A01G 25/02* | (2006.01) |
| *A01C 23/00* | (2006.01) |

(52) U.S. Cl.
CPC .......... *A01C 23/042* (2013.01); *A01C 23/008* (2013.01); *A01G 25/02* (2013.01); *Y10T 137/3112* (2015.04); *Y10T 137/4891* (2015.04)

(58) Field of Classification Search
CPC ................ A01C 23/042; A01C 23/008; Y10T 137/3112; Y10T 137/4891; A01G 25/02
USPC ............................................... 137/268, 205.5
See application file for complete search history.

(56) References Cited

U.S. PATENT DOCUMENTS

| | | | | |
|---|---|---|---|---|
| 3,021,862 A * | 2/1962 | Miller | ................. | A47L 15/4427 137/205.5 |
| 3,776,274 A * | 12/1973 | Riley | .................... | A01C 23/042 137/205.5 |
| 6,230,987 B1 * | 5/2001 | Truong | ................ | A01C 23/042 137/268 |
| 6,966,328 B2 * | 11/2005 | Benham | ..................... | F15D 1/14 137/101.11 |
| 2007/0215722 A1 * | 9/2007 | Smith, III et al. | ... | A01C 23/042 239/398 |

* cited by examiner

*Primary Examiner* — Kevin L Lee
(74) *Attorney, Agent, or Firm* — Quarles & Brady LLP (57) ABSTRACT

A fertilization system may include a flow diverter to divert a portion of water from a ground irrigation system through a tank containing fertilizer and back into the ground irrigation system by creating a high pressure region up stream of the flow diverter and a low pressure region down stream of the flow diverter to provide hydraulic operation of the fertilization system.

18 Claims, 7 Drawing Sheets

FLOW DIVERTER FOR A FERTILIZATION SYSTEM

CROSS REFERENCE TO RELATED APPLICATIONS

This application claims the benefit of U.S. provisional patent application No. 62/065,414 filed Oct. 17, 2014 entitled "FLOW DIVERTER FOR A FERTILIZATION SYSTEM."

BACKGROUND

The subject matter disclosed herein relates to an apparatus for diverting flow from an irrigation system and to provide a chemical mixture back into the irrigation system.

Ground irrigation systems may be used for providing water to an area of ground for watering plants, such as grass, crops, flowers, bushes, and/or trees. The ground irrigation system may include a plurality of pipes having openings along their lengths and may be attached to sprinklers, which may extend partially above the ground to dispense water. A fertilization system may be tapped into a ground irrigation system to inject a certain amount of chemicals, such as fertilizer, into the water of the ground irrigation system for dispersing nutrients to the plants.

These fertilization systems may be installed in remote location, not close to existing power sources. A fertilization system requiring a pump or other electrical device to inject fertilizer into the ground irrigation system may require running electrical lines to the fertilization system.

Accordingly, it may be useful to provide a fertilization system for a ground irrigation system that requires only, hydraulics, or water pressure, to operate and to inject fertilizer into the ground irrigation system.

BRIEF DESCRIPTION OF THE DRAWINGS

Other aspects and advantages of certain embodiments will become apparent upon consideration of the following detailed description, wherein similar structures have similar reference numerals.

DETAILED DESCRIPTION

The present disclosure describes a fertilization system that may be installed into a ground irrigation system for injecting chemicals, such as fertilizer, into the water supplied by the ground irrigation system. To facilitate the injection process, the fertilization system can utilize a liquid or substantially liquid-type fertilizer, Once injected, this combined fluid of chemicals and water may be distributed by a suitable irrigation system and used to supply nutrients to plants. The fertilization system may be powered solely through hydraulic forces to eliminate the need to supply electrical power to the fertilization system. A flow diverter may be inserted into the flow path of water in the ground irrigation system to create an area of high fluid pressure and an area of lower fluid pressure. The area of high fluid pressure may be used to divert fluid out of the ground irrigation system and into the fertilization system. The area of lower fluid pressure may be used to pull chemicals out of the fertilization system and into the ground irrigation system. The fertilization system may have one or more adjustable valves to adjust the flow rate of fluid through the fertilization system, and consequently the amount of fertilizer that is injected into the ground irrigation system.

Figure 1:
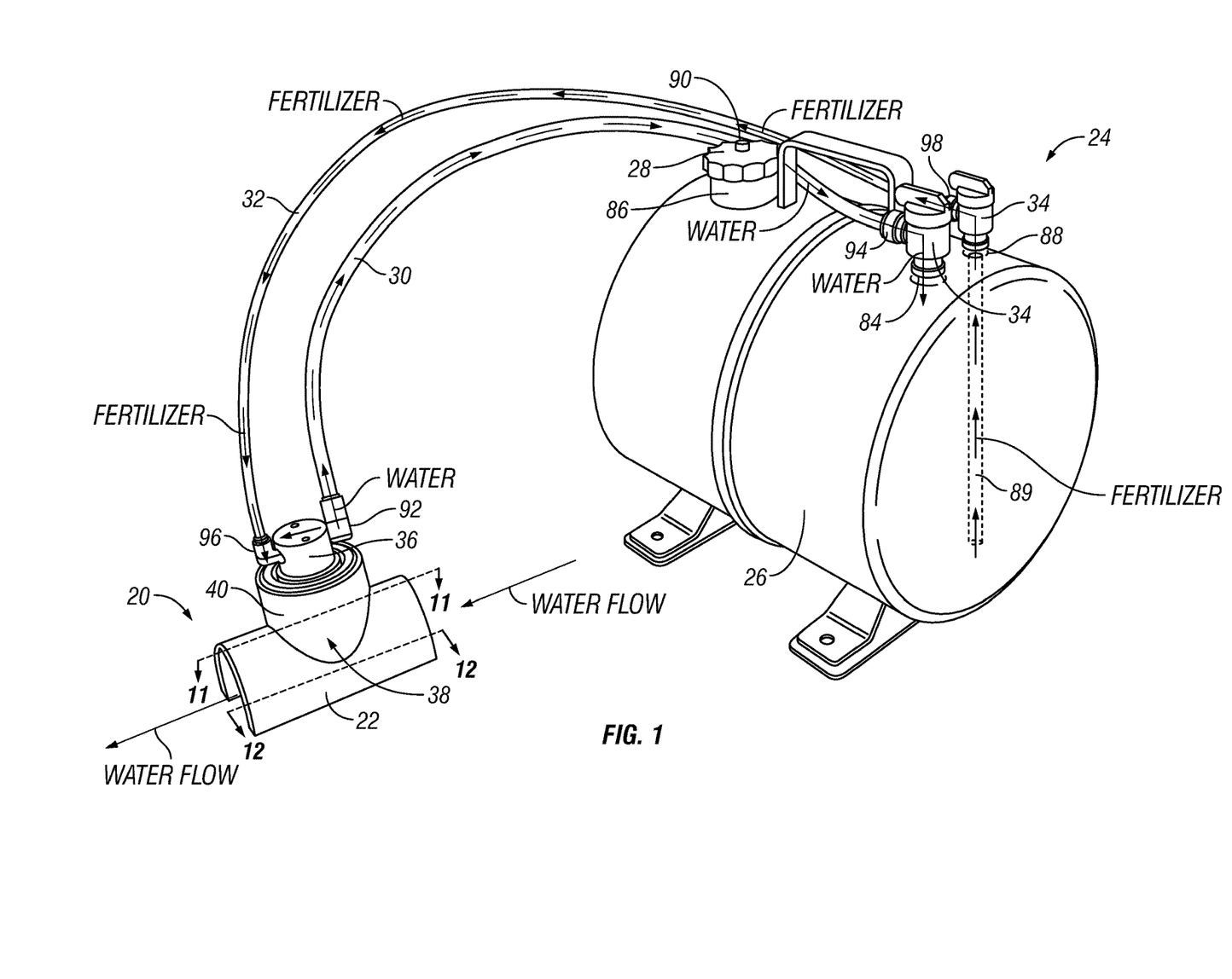
FIG. 1 is a perspective view of a fertilizer system connected to a ground irrigation system and showing the flow paths between the two systems.

The ground irrigation system 20 may include a plurality of pipes 22, coupled on a first end to a fluid source, or water source, and may have a plurality of other ends connected to suitable liquid distribution devices (e.g., sprinkler heads) for the fluid, or water, to exit. The fertilization system 24 may be coupled to the pipe 22 at a location between the first end and the second ends, and may include a tank 26, a fill cap 28, a water conduit 30, a fertilizer conduit 32, and a pair of flow adjustment valves 34. The fertilization system 24 may also include a flow diverter 36 to divert fluid from the pipe 22. It will be appreciated that a plurality of fertilization systems 24 may be installed at various locations along the ground irrigation system 20 to allow an operator to provide different amounts and/or types of fertilizer to different exit locations in the ground irrigation system 20.

Figure 11:
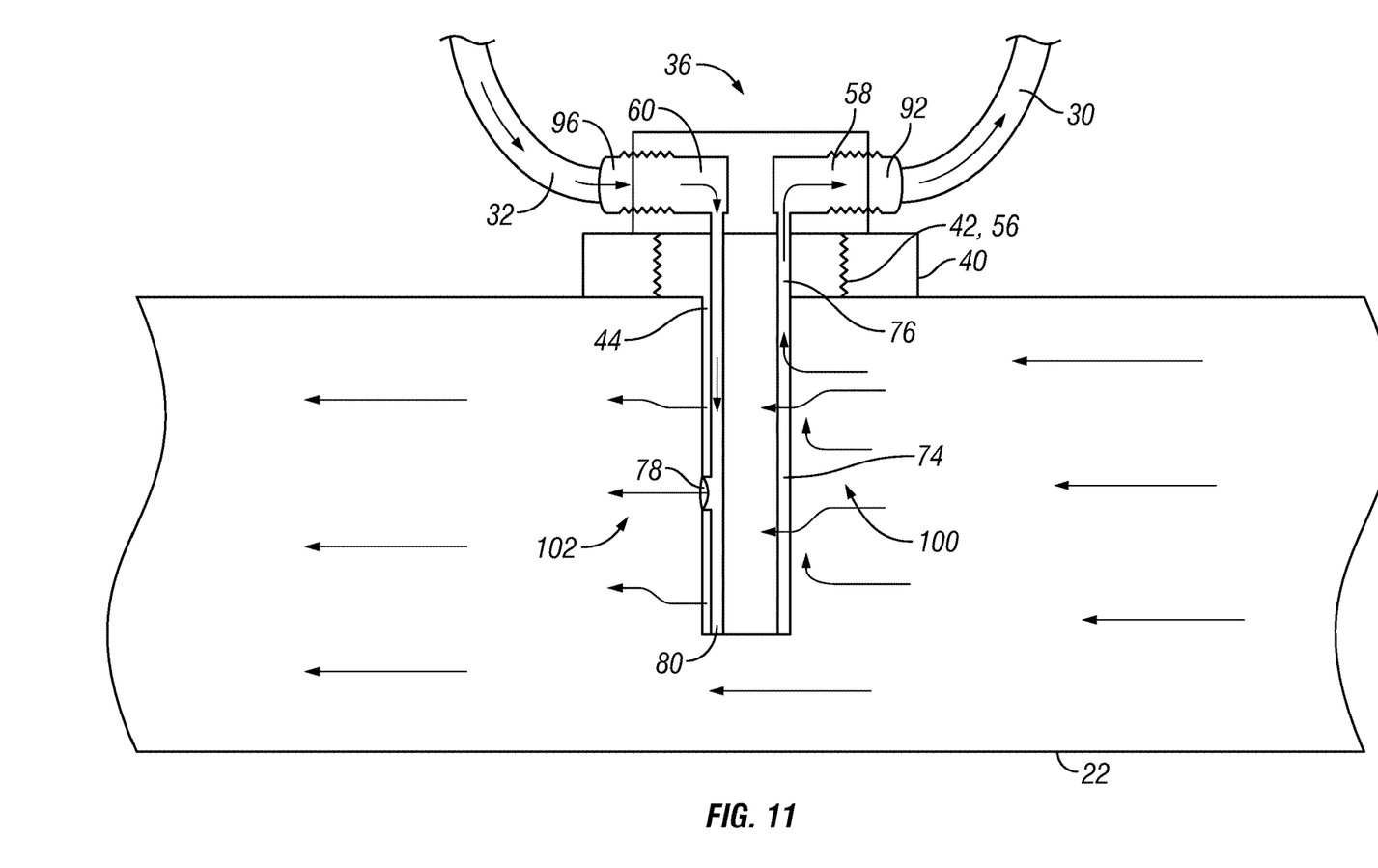
FIG. 11 is a side cross-sectional view of the flow diverter installed in a pipe of the ground irrigation system and showing the flow paths of water and fertilizer in the pipe and the flow diverter taken along line 11-11 of FIG. 1.

A mounting collar or other suitable coupling mechanism 38 may be mounted to the pipe 22 for mechanically and fluidly coupling the pipe 22 and the flow diverter 36. The mounting collar 38 may partially wrap around the circumference of the pipe 22 and may be secured using an adhesive. Alternatively, the mounting collar 38 may be part of the pipe 22. The mounting collar 38 may have a cylindrical section 40 extending perpendicularly away from the pipe 22. The cylindrical section 40 may have a threaded bore 42 extending axially through its radial center. An access bore, such as the access bore 44 shown in FIG. 11, may extend in a radial direction through the pipe 22 and may be coaxial with the threaded bore 42 of the mounting collar 38, and may have a diameter large enough to accept at least a portion of the flow diverter 36. The mounting collar 38 may be fluidly sealed to the pipe 22, such that water may only exit the pipe 22 near the mounting collar 38 by passing through the access bore 44 and the threaded bore 42.

Figure 2:
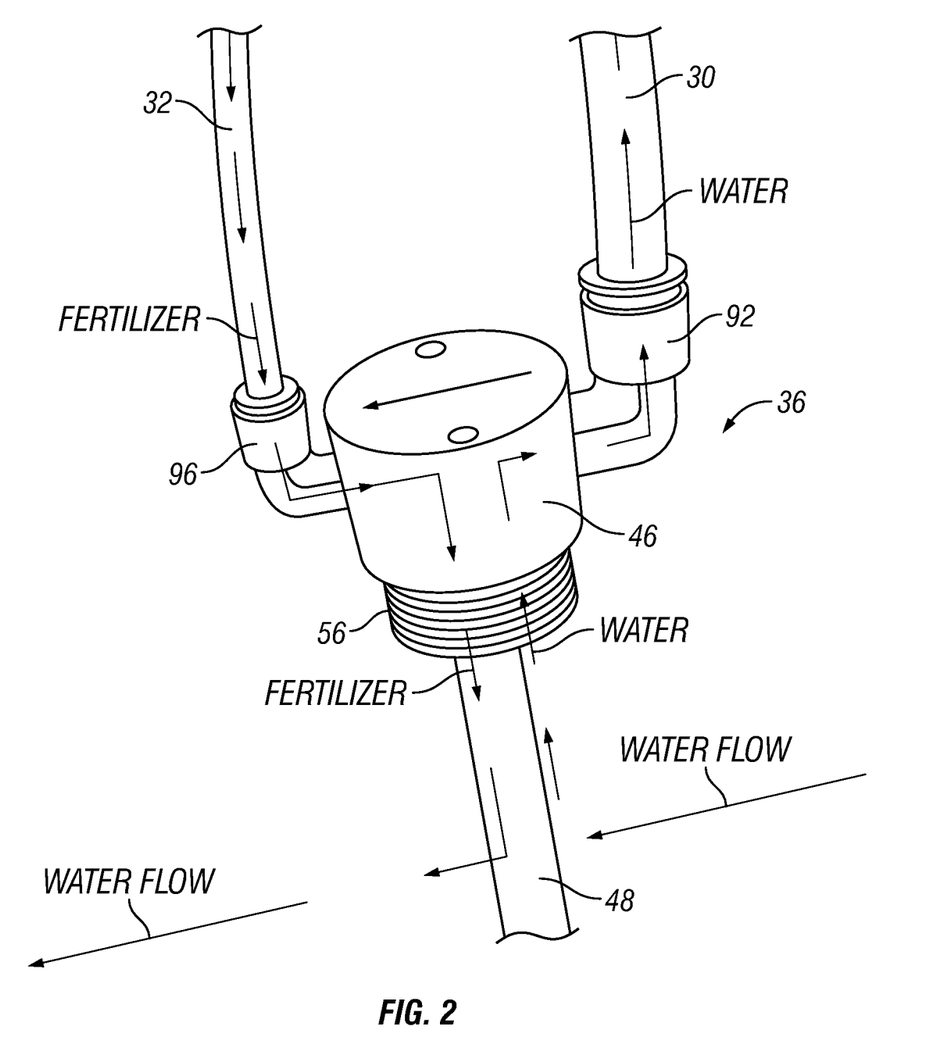
FIG. 2 is a perspective view of a flow diverter and tubes of the fertilizer system showing the flow paths through the flow diverter.
Figure 3:
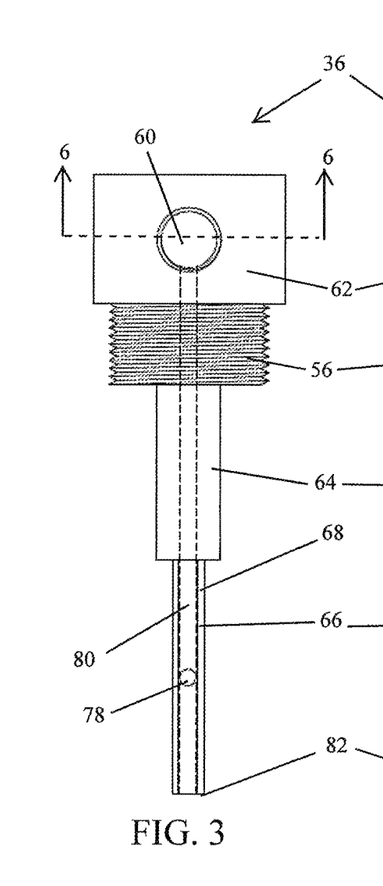
FIG. 3 is a front view of the flow diverter showing an outlet and a fertilizer outlet and a fertilizer bore.
Figures 4, 5, 6, 7:
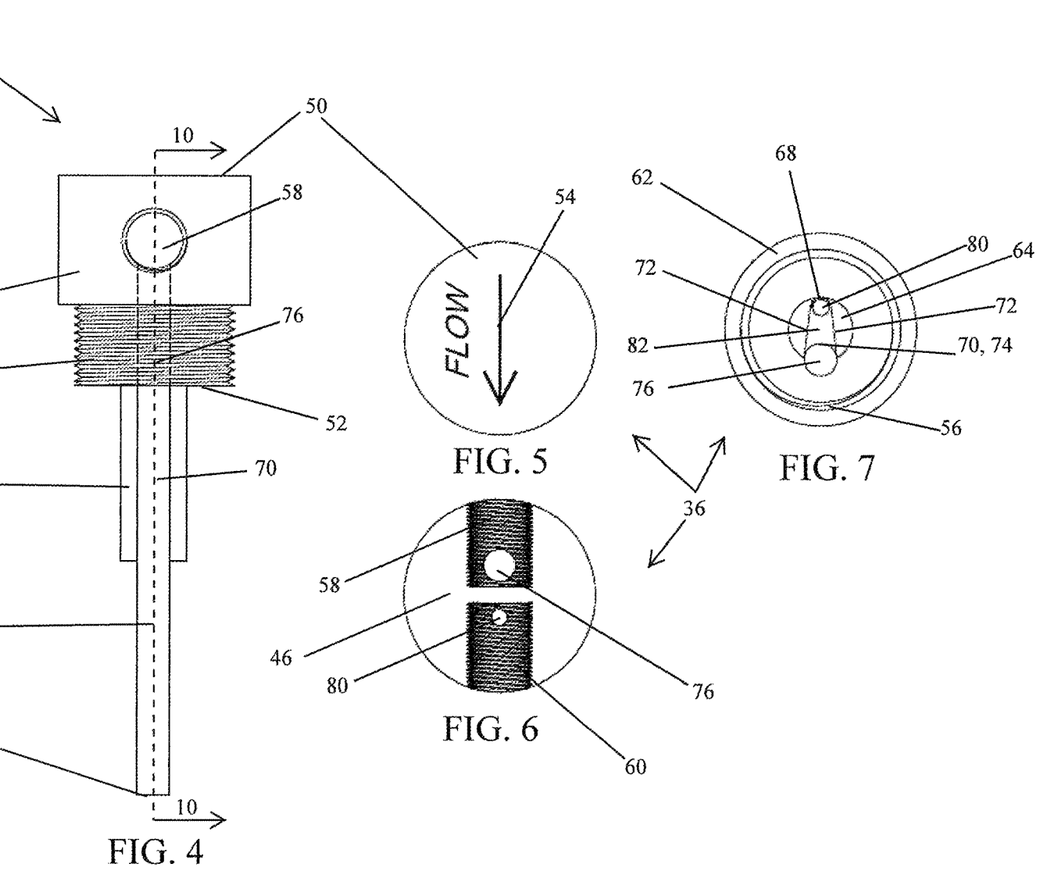
FIG. 4 is a rear view of the flow diverter showing a scoop and a water bore.
FIG. 5 is top view of the flow diverter showing a flow direction indicator.
FIG. 6 is a cross-sectional top view of the flow diverter taken along line 6-6 of FIG. 3, showing a threaded water outlet bore and a threaded chemical inlet bore and showing the fertilizer bore and the water bore.
FIG. 7 is a bottom view of the flow diverter showing the fertilizer bore, the scoop, and a water bore.
Figure 8:
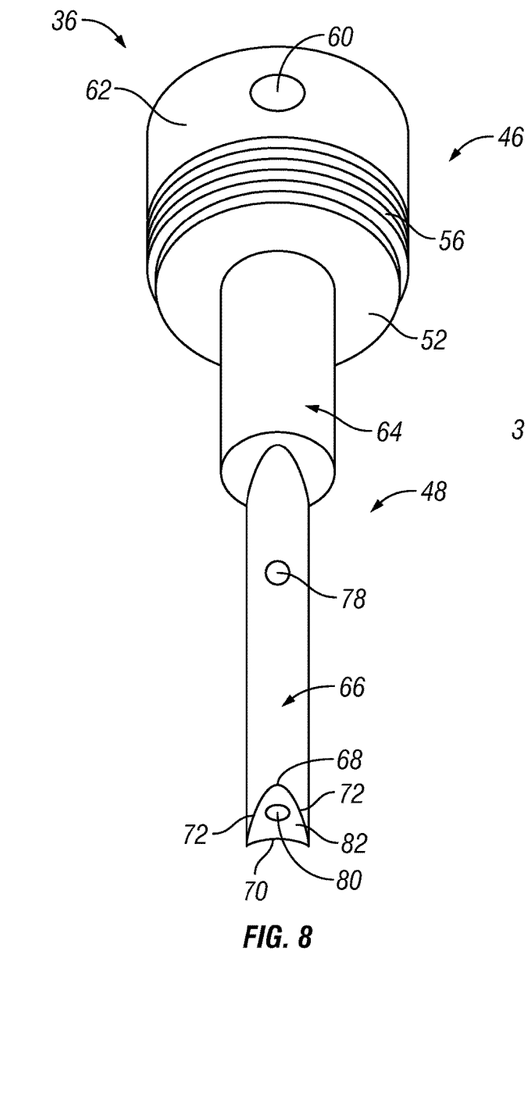
FIG. 8 is lower front perspective view of the flow diverter showing the fertilizer bore and the fertilizer outlet.

The flow diverter 36 may have a cylindrical base 46 and a stem 48 (see, for example, FIG. 2). The base 46 may have an axial upper end 50 and an axial lower end 52. The upper end 50 may have a flow direction indicator 54, such as an arrow, to instruct an operator as to the proper radial orientation of the flow diverter 36 with respect to the pipe 22 while in an installed state. The base 46 may have a threaded portion 56 extending along a portion of the outer radial surface of the base 46, such as toward the lower end 52 and extending axial upward toward the upper end 50. The base 46 may have a water outlet threaded bore 58 and a fertilizer inlet threaded bore 60, both extending radially inward from a non-threaded portion 62 of the outer surface of the base 46. Alternatively, the base 46 may have a water outlet threaded bore 58 and/or a fertilizer inlet threaded bore 60 extending vertically inward from the upper end 50 of the base 46. The water outlet threaded bore 58 and the fertilizer inlet threaded bore 60 may have the same diameter, or may have different diameters. Providing different diameters may be used to provide that an operator can not accidently switch the water conduit 30 and fertilizer conduit 32 during installation or maintenance.

The stem 48 of flow diverter 36 may be a two tiered stem including an upper tier 64 and a lower tier 66. The upper tier stem 64 may generally be cylindrical in shape and may attach at its upper end to the base 46 and on its lower end to the lower tier stem 66. The upper tier stem 64 may have a circumference that is slightly smaller than the circumference of the base 46, and may provide some additional rigidity to the overall stem 48. The lower tier stem 66 may have a front portion 68 and a rear portion 70 in the direction of flow of fluid in the pipe 22. The front portion 68 may be narrower than the rear portion 70, and two side portions 72 may extend between the front portion 68 and the rear portion 70 to create an irregularly shaped triangle. The lower tier stem 66 may have a smaller cross-section and different cross-sectional shape than the upper tier stem 64. The front portion 68 may be convex in profile when viewed from the front of the flow diverter 36, and may have a smooth transition between the front portion 68 and the side portions 72, while the rear portion 70 may be concave in profile along, at least a portion of its length when viewed from the rear of the flow diverter 36. The rear portion 70 may also be an inlet side for the flow diverter 36, while the front portion 68 may be an outlet side.

Figure 9:
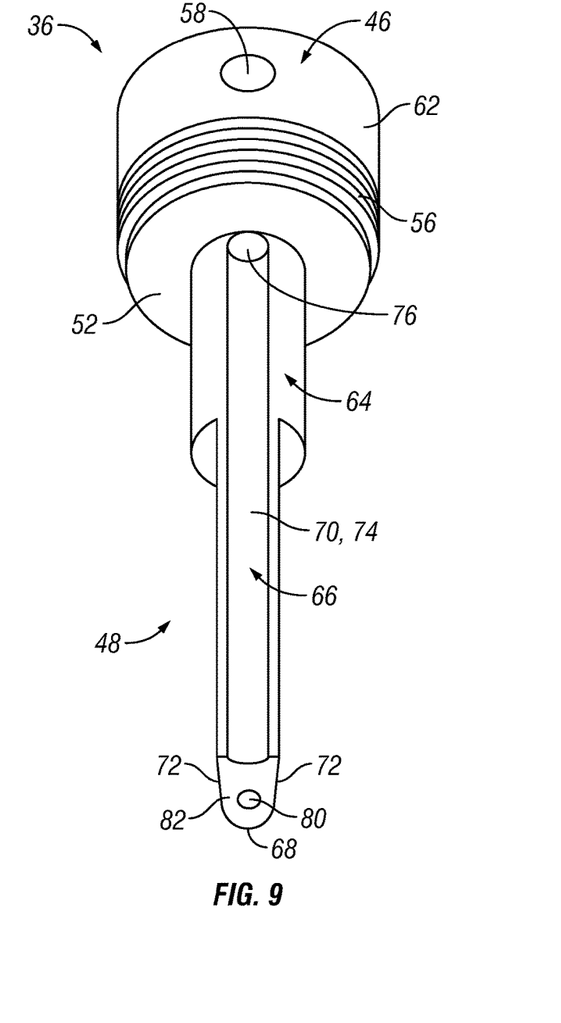
FIG. 9 is a lower rear perspective view of the flow diverter showing the scoop and the water bore.
Figure 10:
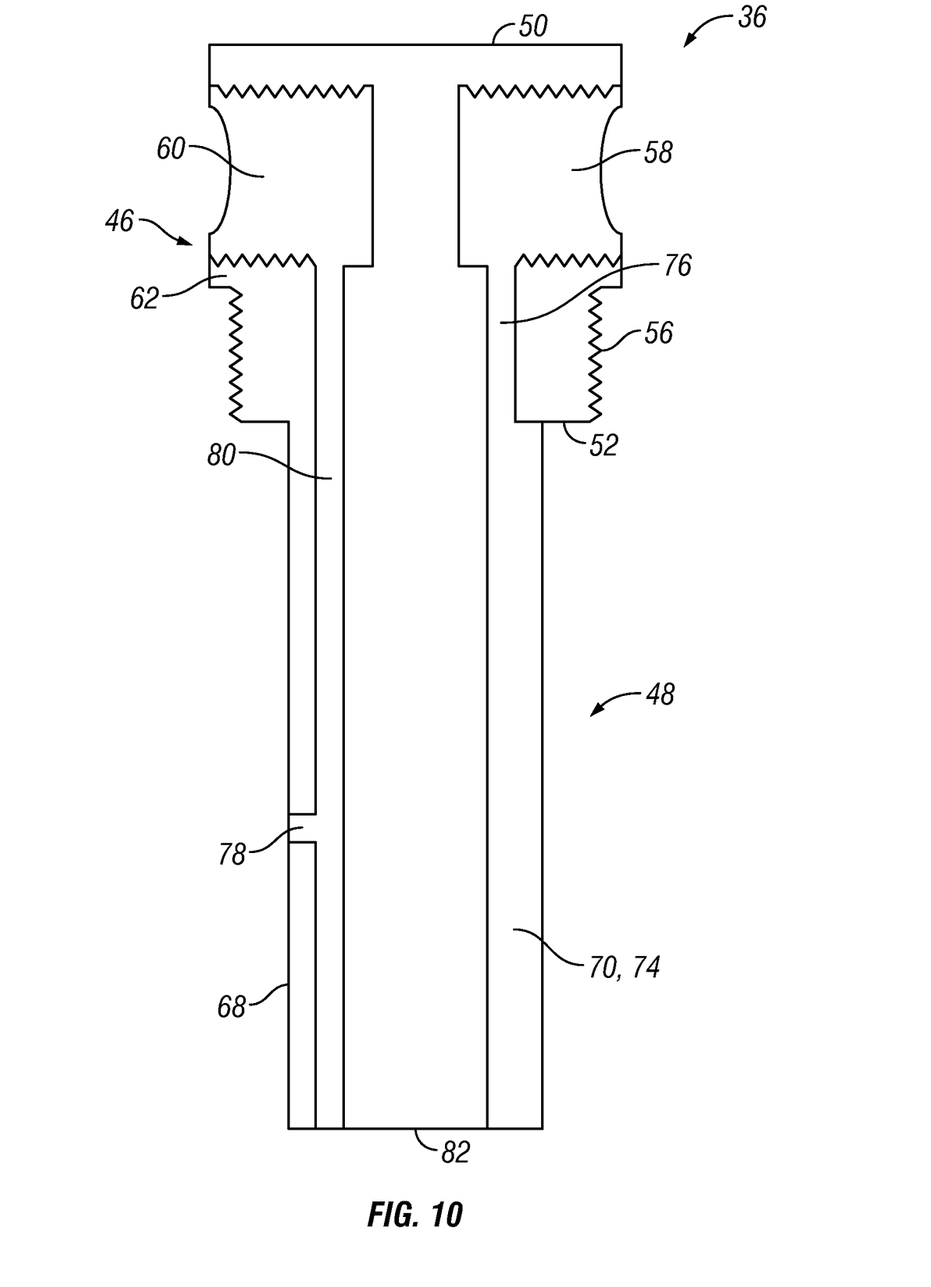
FIG. 10 is a side cross-sectional view of the flow diverter take along line 10-10 of FIG. 4.

The concave shape of the rear portion 70 may be implemented as a scoop spoon 74, structure which may extend lengthwise along the rear portion 70 of the lower tier stem 66, and may also extend upward through a portion of the upper tier stem 64, creating a concave cutout through a portion of the outer radial surface of the upper tier stem 64, and may connect to a substantially vertical water inlet bore 76 in the base 46 (see, for example, FIG. 9). The water inlet bore 76 may extend upward through the base 46 into the water outlet threaded bore 58 to fluidly connect the scoop 74 to the water outlet threaded bore 58.

Figure 12:
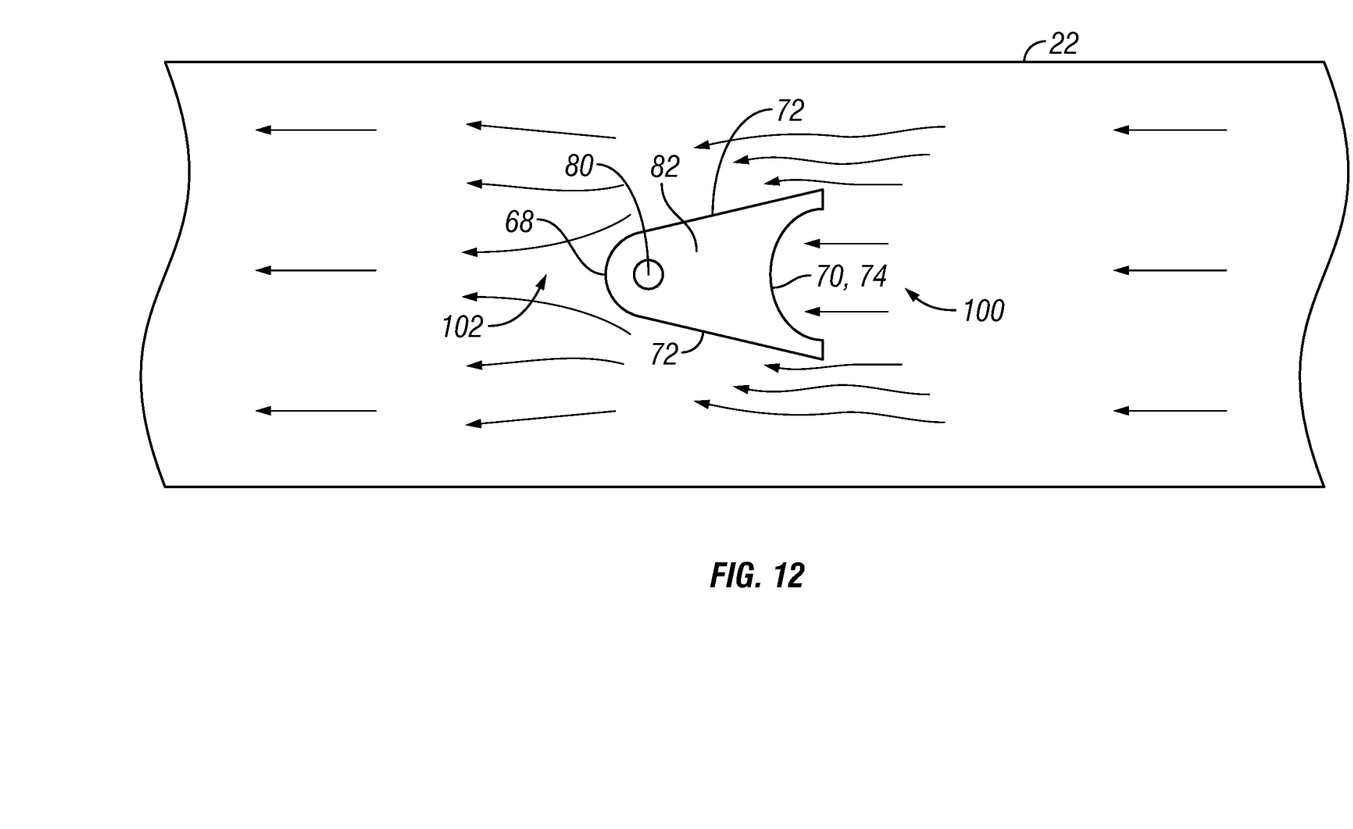
FIG. 12 is a top cross-sectional view of a lower tier stem of the flow diverter installed in a pipe of an example ground irrigation system and showing the flow paths of water and fertilizer in the pipe taken along line 12-12 of FIG. 1 during a typical use case.

The larger cross section of the rear portion 70 may reduce the overall cross-sectional area of the pipe 22 at the location the rear portion 70, as shown in FIG. 12. This, along with the concave profile, impedes the flow of fluid around and past the flow diverter 36 when fluid flows through pipe 22, operating to create a higher fluid pressure around the rear portion 70. Conversely, the smaller cross-sectional area of the front portion 68, compared to the rear portion 70, creates a low pressure region in the pipe 22 around the front portion 68.

The front portion 68 may have one or more outlets 78 extending generally in the direction of the fluid flow through pipe 22 and located between a portion of the outer surface of the front portion 68 and a vertical stem fertilizer bore 80. The vertical stem fertilizer bore 80 may extend in a substantially vertical direction, forward of the scoop 74, and may pass between a bottom surface 82 of the lower tier stem 66 and may extend upward through the upper tier stem 64 and base 46 and into the fertilizer inlet threaded bore 60 to fluidly connect the fertilizer 78 with the fertilizer inlet threaded bore 60.

The tank 26 may have a tank water inlet 84, a fertilizer fill opening 86, and a tank fertilizer outlet 88. The fertilizer fill opening 88 may be selectively covered and uncovered using the cap 28. The cap 28 and the fertilizer fill opening 88 may both be threaded to secure the cap 28 to the fertilizer fill opening 88. The cap 28 may have a pressure release screw 90, which selectively covers a pressure relief bore extending through the cap 28. The tank water inlet 84 may pass through a top portion of the tank 26. The tank fertilizer outlet 88 may also extend through a top portion of the tank 26 and may extend, such as in the form of a pipe 89, downward toward the bottom of the interior of the tank 26. In other words, the sides of tank water inlet 84 and the tank fertilizer outlet 88 that terminate in the interior of the tank 26 may be located at different vertical locations within the interior of the tank 26, for example the tank fertilizer outlet 88 may terminate lower in the tank 26. Both the tank water inlet 84 and the tank fertilizer outlet 88 may each couple to a separate flow adjustment valves 34 for controlling the flow rate of water into the tank 26 and fertilizer out of the tank 26.

The flow diverter 36 may be fluidly coupled to the tank 26 using the water conduit 30 and the fertilizer conduit 32. The fertilizer conduit 32 may be semitransparent to allow an operator to see the color of the fluid flowing through the fertilizer conduit 32 to confirm proper fertilizer flow through the flow diverter 36. This may allow an operator to determine if additional fertilizer needs to be added to the tank 26, without the need to open up the tank 26. The water conduit 30 may have a pair of threaded quick connects 92 and 94 attached to each of its ends. One threaded quick connect 92 may couple the water conduit 30 to the water outlet threaded bore 58 of the flow diverter 36, while the second threaded quick connect 94 may be threaded into the flow adjustment valve 34 attached to the tank water inlet 84. The fertilizer conduit 32 may similarly have a pair of threaded quick connects 96 and 98 attach to both of its ends. One threaded quick connect 96 may couple the fertilizer conduit 32 to the fertilizer inlet threaded bore 60 of the flow diverter 36, while the other threaded quick connect 98 may be threaded into the flow adjustment valve 34 attached to the tank fertilizer outlet 88. The water conduit 30 and the fertilizer conduit 32 may have the same cross-sectional area, or as shown in HG. 1, or the fertilizer conduit 32 may have a smaller cross-sectional area. In this arrangement, there is therefore a fluid circuit formed between the water inlet bore 76, water outlet threaded bore 58, water conduit, tank 26, fertilizer conduit 32, fertilizer inlet threaded bore 60, and fertilizer outlet 78 (and, if present, vertical stem fertilizer bore 80).

The fertilization system 24 may be installed onto the ground irrigation system 20 by attaching the mounting collar 38 to a portion of pipe 22. Water from the water source may be turned off to prevent water from flowing through the pipe 22 during installation. The access bore 44 may be drilled through the pipe 22, such that it is coaxial with the threaded bore 42 of the mounting collar 38. The access bore 44 should have a diameter that is at least equal to the diameter of the upper tier of the stem 48 of the flow diverter 36. The mounting collar 33 may then be attached and fluidly sealed to the pipe 22, for example, with an adhesive. The stem 48 of the flow diverter 36 may be inserted into the access bore 44 and the threaded portion 56 may be threaded with the threaded bore 42 to secure and fluidly seal the flow diverter 36 to the mounting collar 38 and the pipe 22 with stem 48 being disposed within the interior volume of pipe 22.

Upon installation, the flow diverter 36 is preferably rotated such that the flow direction indication 54 matches the desired water flow direction through the pipe 22 (i.e. the fertilizer outlet 78 is downstream and the scoop 74 is upstream). The quick connects 92 and 96 may be threaded into the water outlet threaded bore 58 and the fertilizer inlet threaded bore 60, respectively.

The tank 26 may be bolted or secured to the ground in a desired location, or may be free standing. The flow adjustment valves 34 may be installed onto the tank water inlet 84 and the tank fertilizer outlet 88 and the threaded quick connects 92 and 96 may be threaded into the flow adjustment valves 34. The water conduit 30 may be coupled to the quick connects 92 and 94, and similarly, the fertilizer conduit 32 may be coupled to the quick connects 96 and 98. Fertilizer may then be added to the tank 26 through the fertilizer fill opening 86, the flow adjustment valves 34 may be set to a desired flow rate (or can be adjusted later, after monitoring system performance), and water from the water source may be allowed to flow through the ground irrigation system 20 and, specifically, through pipe 22.

In operation of the ground irrigation system 20 and the fertilizer system 24, water is generally pumped or allowed to flow from the water source through the one or more pipes 22 in the ground irrigation system 20. The water may encounter one or more flow diverters 36, which due to the wider cross-sectional area of the flow diverter 36, creates a high pressure region 100 in the pipe 22 at the rear portion 70 of the flow diverter 36. The smaller cross-sectional area of the front portion 68 of the flow diverter 36 creates a low pressure region 102 in the pipe 22. The high pressure region 100 operates to push water into and through the fertilizer system 24, while the low pressure region 102 operates to pull fertilizer through and out of the fertilizer system 24. This operation provides a fertilization system 24 that is purely hydraulic in operation, requiring no pump or power source attached directly to the fertilization system 24.

When water flows through the pipe 22, water in the pipe 22 will attempt to flow from the high pressure region 100 to the low pressure region 102, or regions, by flowing around the sides portions 72 of the flow diverter 36, under the bottom surface 82 of the flow diverter 36, and upward along the scoop 74 into the vertical water inlet bore 76 of the flow diverter 36. The rear portion 70 may not smoothly transition to the side portions 72 (i.e. there may be a semi abrupt turn or corner), which may create turbulence in the water flow that passes around and underneath the flow diverter 36. A portion of the water will flow upward along the scoop 74 and into the vertical water inlet bore 76 and from the vertical water inlet bore 76 through the water outlet threaded bore 58, threaded quick connect 92, and into the water conduit 30. Water will then enter the tank 26 by flowing from the water conduit 30, through the threaded quick connect 94 and flow adjustment valve 34, and into the top of the tank 26 through the tank water inlet 84. This increases the pressure in the tank 26 and due to the bottom of the pipe 89 being lower than the bottom of the tank water inlet 84, forces the fertilizer upward through the pipe 89 and out of the tank 26 through the tank fertilizer outlet 88. From the tank fertilizer outlet 88, the fertilizer will flow through the flow adjustment valve 34 and the threaded disconnect 96 into the fertilizer conduit 32. From the fertilizer conduit 32, the fertilizer (potentially mixed with some amount of water received from pipe 22) flows through the threaded quick connect 98 and into the fertilizer inlet threaded bore 60 of the flow diverter 36. Fertilizer may then pass through the vertical stem fertilizer bore 80 and out the fertilizer outlet 78 into the pipe 22. Additionally, fertilizer may pass through the vertical stem fertilizer bore 80 and into the pipe 22 through an opening in the bottom surface 82 of the flow diverter 36. Note that in various embodiments, the opening in the bottom surface 82 of the flow diverter 36 is not formed so that fertilizer only flows out of the fertilizer outlet 78. Turbulent flow in the pipe 22 around the flow diverter 36 may aid in mixing the water with fertilizer exiting the front portion 68 of the flow diverter 36.

The fertilizer system 24 may be refilled, such as when the tank 26 is mostly, or completely, filled with water and fertilizer is mostly, or completely depleted by closing the flow adjustment valves 34 to stop flow of water into the tank 26 and water and/or any remaining fertilizer from exiting the tank 26, and then removing the pressure release screw 90 from the cap 28 to equalize the pressure between the ambient atmosphere and the interior of the tank 26, which may make removal of the cap 28 easier. The cap 28 can then be removed from the tank 26 to provide access to the fertilizer fill opening 86 and the interior of the tank 26. The water in the tank 26 may be drained by either keeping the tank fertilizer outlet 88 flow adjustment valve 34 at least partially or fully open, such that water is pulled out of the tank 26, but no additional water is added to the tank 26, or by siphoning the water out of the tank 26. Fertilizer in liquid or solid form (when in solid form, the fertilizer may be configured to mix with liquid in tank 26 to facilitate transport through the fertilizer conduit 32) may be poured into the interior of the tank 26 through the fertilizer fill opening 86. After the desired amount of fertilizer has been added to the tank 26, the cap 28 may be rethreaded into the fertilizer fill opening 86 and the pressure release screw 90 may be rethreaded into the cap 28 to fluidly seal the tank 26 from the ambient atmosphere. The flow adjustment valves 34 may then be at least partially reopened to achieve the desired flow rate through the fertilizer system 24.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

What is claimed is:
1. A fertilizer system, comprising:
  a tank, comprising:
    a fertilizer fill opening configured to be selectively covered and uncovered using a cap,
    a tank water inlet configured to flow water into the tank and a tank fertilizer outlet configured to flow fertilizer out of the tank;
a flow diverter, comprising:
a base comprising:
a water outlet threaded bore and
a fertilizer inlet threaded bore,
a stem comprising:
a scoop spoon configured to channel water into the base and an outlet configured to release fertilizer into a pipe in an irrigation system,
a vertical water inlet bore configured to fluidly couple the scoop spoon with the water outlet threaded bore,
a vertical stem fertilizer bore configured to fluidly couple the fertilizer inlet threaded bore with the outlet,
a wider cross-sectional area at a rear portion of the stem configured to create a high pressure region in the pipe,
a narrower cross-section area at a front portion of the stem that is narrower than the wider cross-sectional area at the rear portion of the stem configured to create a low pressure region in the pipe and
wherein the high pressure region operates to push water upward along the scoop spoon and the low pressure region operates to pull fertilizer through the vertical stem fertilizer bore;
a water conduit configured to fluidly couple the water outlet threaded bore of the base of the flow diverter with the tank water inlet;
a fertilizer conduit configured to fluidly couple the fertilizer inlet threaded bore of the base of the flow divert with the tank fertilizer outlet; and
a mounting collar configured to mechanically and fluidly couple the flow diverter with the pipe in the irrigation system.

2. The fertilizer system of claim 1, wherein the fertilizer system is purely hydraulic in operation, requiring no pump or power source attached directly to the fertilizer system.

3. The fertilizer system of claim 1, wherein the water outlet threaded bore and the fertilizer inlet threaded bore have different diameters.

4. The fertilizer system of claim 1, wherein the scoop spoon is on the opposite side of the stem from the outlet, wherein the scoop spoon is configured to be upstream in the pipe of the irrigation system and wherein the outlet is configured to be downstream in the pipe of the irrigation system.

5. The fertilizer system of claim 1, wherein the water conduit fluidly connects to the tank water inlet through a flow adjustable valve.

6. The fertilizer system of claim 1, wherein the fertilizer conduit fluidly connects to the tank fertilizer outlet through a flow adjustable valve.

7. The fertilizer system of claim 1, wherein the scoop spoon is a concave shape of a rear portion of the stem of the flow diverter.

8. A flow diverter configured to dispense a fertilizer into a pipe coupled to an irrigation system, comprising:
a concave scoop spoon that extends lengthwise along a stem of a flow diverter,
wherein the stem of the flow diverter comprises:
a wider cross-sectional area at a rear portion of the stem configured to create a high pressure region in the pipe,
a narrower cross-section area at a front portion of the stem that is narrower than the wider cross-sectional area at the rear portion of the stem configured to create a low pressure region in the pipe and
wherein the high pressure region operates to push water upward along the scoop and the low pressure region operates to pull fertilizer through the vertical stem fertilizer bore;
a vertical water inlet bore running through a base of the flow diverter, wherein the concave scoop spoon is configured to flow water along the scoop and into the vertical water inlet bore;
a water outlet threaded bore in the base of the flow diverter, wherein the vertical water inlet bore is configured to flow water into the water outlet threaded bore and wherein the water outlet threaded bore is configured to flow water through a water conduit to a tank;
a fertilizer inlet threaded bore in the base of the flow diverter, wherein the fertilizer inlet threaded bore is configured to receive water and fertilizer through a fertilizer conduit from the tank;
a vertical stem fertilizer bore running through the base and the stem of the flow diverter, wherein the vertical stem fertilizer bore is configured to receive water and fertilizer from the fertilizer inlet threaded bore; and
an outlet in the stem of the flow diverter, wherein the outlet in the stem is configured to receive water and fertilizer from the vertical stem fertilizer bore and dispense water and fertilizer into a pipe coupled to an irrigation system.

9. The flow diverter of claim 8, wherein the flow diverter is purely hydraulic in operation, requiring no pump or power source attached directly to the flow diverter.

10. The flow diverter of claim 8, wherein the water outlet threaded bore and the fertilizer inlet threaded bore have different diameters.

11. The flow diverter of claim 8, wherein the concave scoop spoon is on the opposite side of the stem from the outlet, wherein the concave scoop spoon is configured to be upstream in the pipe of the irrigation system and wherein the outlet is configured to be downstream in the pipe of the irrigation system.

12. The flow diverter of claim 8, wherein the water conduit fluidly connects to the tank water inlet through a first flow adjustable valve and the fertilizer conduit fluidly connects to the tank fertilizer outlet through a second flow adjustable valve.

13. The flow diverter of claim 8, wherein the fertilizer conduit is semitransparent.

14. A flow diverter configured to dispense a fertilizer into a pipe coupled to an irrigation system, comprising:
a concave scoop spoon that extends lengthwise along a stem of a flow diverter;
a vertical water inlet bore running through a base of the flow diverter configured to be fluidly coupled to the concave scoop spoon;
a water outlet threaded bore in the base of the flow diverter configured to be fluidly coupled to the vertical water inlet bore and the water outlet threaded bore is configured to be fluidly coupled through a water conduit to a tank;
a fertilizer Inlet threaded bore in the base of the flow diverter configured to be fluidly coupled through a fertilizer conduit from the tank;
a vertical stem fertilizer bore running through the base and the stem of the flow diverter configured to be fluidly coupled to the fertilizer inlet threaded bore;
an outlet in the stem of the flow diverter configured to be fluidly coupled to the vertical stem fertilizer bore and configured to dispense water and fertilizer into a pipe coupled to an irrigation system; and wherein the stem comprises:

a wider cross-sectional area at a rear portion configured to create a high pressure region in the pipe, a narrower cross-section area at a front portion, that is narrower than the wider cross-sectional area at the rear portion of the stem, configured to create a low pressure region in the pipe and wherein the high pressure region operates to push water into and through a fertilizer system and the low pressure region operates to pull fertilizer through and out of the fertilizer system.

15. The flow diverter of claim 14, wherein the fertilizer system is purely hydraulic in operation, requiring no pump or power source attached directly to the fertilizer system.

16. The flow diverter of claim 14, wherein the water outlet threaded bore and the fertilizer inlet threaded bore have different diameters.

17. The flow diverter of claim 14, wherein the concave scoop spoon is on the opposite side of the stem from the outlet, wherein the concave scoop spoon is configured to be upstream in the pipe of the irrigation system and wherein the outlet is configured to be downstream in the pipe of the irrigation system.

18. The flow diverter of claim 14, wherein the concave scoop spoon comprises a concave shape of a rear portion of the stem of the flow diverter.

* * * * *